(12) United States Patent
Sander

(10) Patent No.: US 11,584,219 B2
(45) Date of Patent: Feb. 21, 2023

(54) RADIATOR ASSEMBLY FOR VEHICLE

(71) Applicant: Brose Fahrzeugteile SE & Co. Kommanditgesellschaft, Coburg, Coburg (DE)

(72) Inventor: Jan Sander, Meeder (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 0 days.

(21) Appl. No.: 17/482,834

(22) Filed: Sep. 23, 2021

(65) Prior Publication Data
US 2022/0097514 A1 Mar. 31, 2022

(30) Foreign Application Priority Data
Sep. 25, 2020 (DE) .................... 10 2020 212 130.3

(51) Int. Cl.
| F01P 3/18 | (2006.01) |
| F28D 1/02 | (2006.01) |
| F28D 1/053 | (2006.01) |
| B60K 11/08 | (2006.01) |
| B60K 11/04 | (2006.01) |
| F01P 5/06 | (2006.01) |
| F01P 11/10 | (2006.01) |

(52) U.S. Cl.
CPC ............ B60K 11/085 (2013.01); B60K 11/04 (2013.01); F01P 5/06 (2013.01); F01P 11/10 (2013.01)

(58) Field of Classification Search
CPC ..... F01P 3/18; F01P 1/10; F28D 1/024; F28D 1/053
See application file for complete search history.

(56) References Cited

U.S. PATENT DOCUMENTS

| 4,067,384 | A | * | 1/1978 | Miyakawa | ................ F28F 1/32 165/172 |
| 6,472,043 | B1 | | 10/2002 | Kobayashi et al. | |
| 2005/0067152 | A1 | | 3/2005 | Huang | |
| 2007/0227707 | A1 | | 10/2007 | Baugh | |
| 2011/0101714 | A1 | | 5/2011 | Bator | |
| 2012/0024509 | A1 | * | 2/2012 | Ueno | .................... F28F 17/005 165/173 |
| 2013/0220574 | A1 | * | 8/2013 | Zeolla | .................... B60K 11/08 165/42 |
| 2014/0360704 | A1 | * | 12/2014 | Kim | ...................... F28D 1/0435 165/140 |

(Continued)

FOREIGN PATENT DOCUMENTS

| CH | 516130 A | 11/1971 |
| DE | 436155 C | 3/1927 |

(Continued)

*Primary Examiner* — Long T Tran
(74) *Attorney, Agent, or Firm* — Dickinson Wright PLLC

(57) ABSTRACT

A radiator assembly in which numerous fins of a cooling element extending between two coolant channels of the cooling element are divided into at least two different cooling zone, a ventilator of the radiator assembly at least partially covers a first cooling zone of the at least two different cooling zones with respect to a direction extending from the ventilator module toward the cooling element, and a gap width of a gap between two adjacent fins in the first cooling zone is greater than that in a second cooling zone of the at least two different cooling zones.

20 Claims, 3 Drawing Sheets

(56) References Cited

U.S. PATENT DOCUMENTS

| | | | |
|---|---|---|---|
| 2014/0360705 A1* | 12/2014 | Kim | F28D 1/05366 165/140 |
| 2015/0377558 A1* | 12/2015 | Han | F28F 1/128 165/151 |
| 2018/0022209 A1* | 1/2018 | Shiheiber | B60K 11/06 165/288 |
| 2018/0184732 A1 | 7/2018 | Plant | |
| 2020/0033062 A1* | 1/2020 | Barney | F28D 1/05366 |
| 2020/0182563 A1* | 6/2020 | Glickman | F28F 1/24 |
| 2020/0239329 A1* | 7/2020 | Patey | C02F 1/14 |

FOREIGN PATENT DOCUMENTS

| | | |
|---|---|---|
| DE | 509314 C | 10/1930 |
| DE | 1686460 U | 11/1954 |
| DE | 3427161 A1 | 1/1985 |
| DE | 4142023 A1 | 6/1993 |
| DE | 19615875 A1 | 10/1997 |
| DE | 19910312 A1 | 11/2000 |
| DE | 102004016344 A1 | 10/2004 |
| DE | 102004035741 A1 | 3/2005 |
| DE | 102010024733 A1 | 12/2011 |
| DE | 102010046471 A1 | 3/2012 |
| DE | 102012202883 A1 | 8/2013 |
| DE | 202017100043 U1 | 1/2017 |
| DE | 102016105645 A1 | 9/2017 |
| DE | 102018106007 A1 | 9/2018 |
| DE | 102018120660 A1 | 2/2019 |
| DE | 102018009432 A1 | 5/2019 |
| DE | 102018124192 A1 | 5/2019 |
| DE | 112018002969 T5 | 2/2020 |
| DE | 102019128941 A1 | 4/2021 |
| EP | 1391550 A1 | 2/2004 |
| EP | 1541424 B1 | 1/2008 |
| FR | 2774144 A1 | 7/1999 |
| GB | 2323146 A | 9/1998 |
| JP | 2018100616 A | 6/2018 |
| WO | 2005028849 A1 | 3/2005 |
| WO | 2011003444 A1 | 1/2011 |

\* cited by examiner

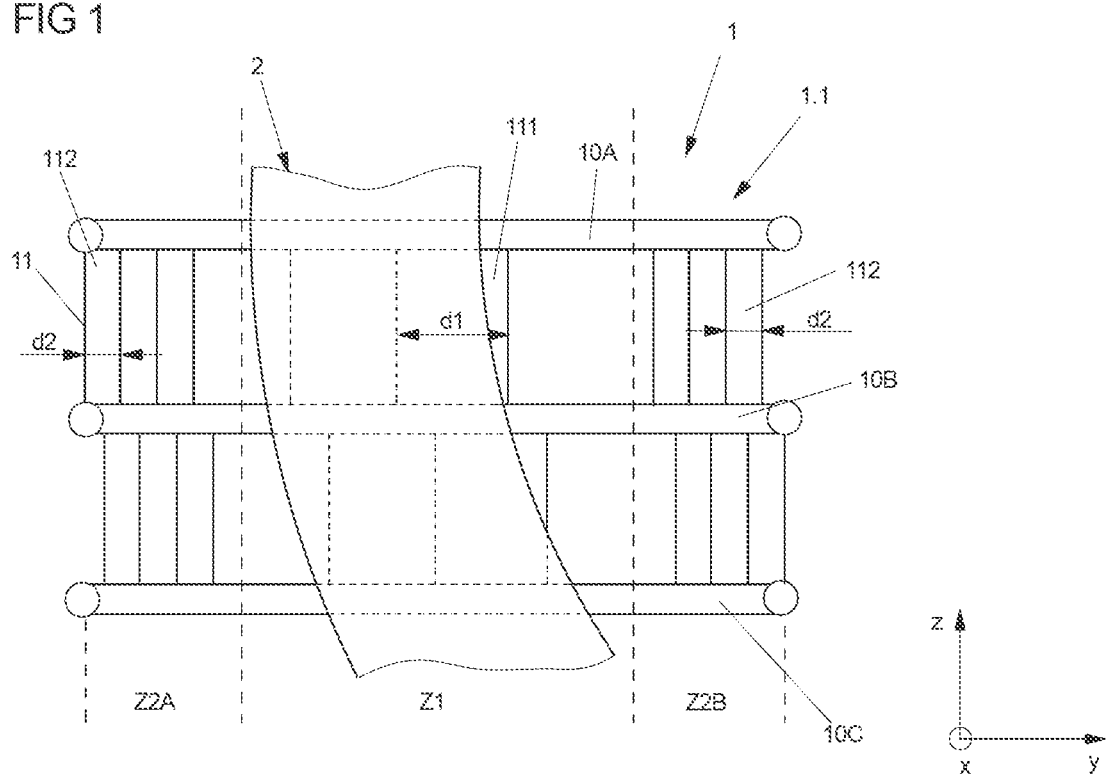

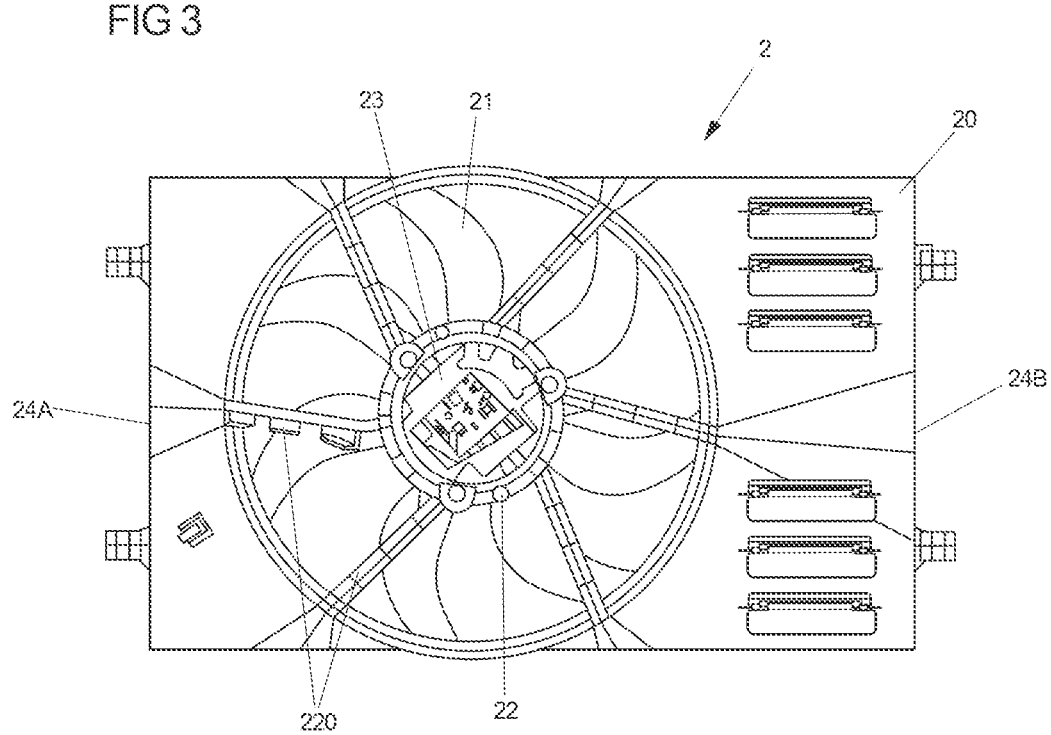

RADIATOR ASSEMBLY FOR VEHICLE

CROSS-REFERENCE TO RELATED APPLICATIONS

This application claims priority to German Patent Application No. DE 10 2020 212 130.3, filed on Sep. 25, 2020, the disclosure of which is hereby incorporated in its entirety by reference herein.

TECHNICAL FIELD

The proposed disclosure relates to a radiator assembly for a vehicle.

BACKGROUND

Radiator assemblies for vehicles, for example for motor vehicles, are well known. Part of such a radiator assembly is a radiator for cooling a drive engine in the vehicle, which comprises at least one cooling element that has numerous coolant channels for this. The coolant channels are spaced apart and typically parallel to one another. To improve the heat dissipation, there are numerous fins extending between at least two coolant channels, between which gaps are formed for cooling airflow. Heat from the cooling liquid in the coolant channels is released to the cooling airflow via the fins.

There is also at least one ventilator module comprising a fan that directs the cooling airflow toward the cooling element in these known radiator assemblies. An (additional) cooling airflow can also be generated by rotating the at least one fan in this ventilator module, e.g. when the vehicle is travelling slowly, or stationary. There are also known ventilator modules that comprise cooling flaps that can be adjusted as needed, i.e. opened or closed, in order to control the cooling airflow passing through the radiator assembly based on the vehicle's travel.

The coolant channels in the cooling element are typically tubes with a rectangular cross section, connected in pairs by the fins. At least part of the cooling element is covered by a ventilator module in front of the cooling element, blocking the cooling airflow. The flow speed of a cooling airflow is therefore lower in the area of the cooling element covered by the ventilator module than in the areas of the cooling element not covered by the ventilator module.

Based on this known design for radiator assemblies, the fundamental object of the invention is to produce an improved radiator assembly with which it is possible to obtain an improved heat transfer from a coolant in the coolant channels in the cooling element to a cooling airflow through the bordering fins in the cooling element with an upstream ventilator module.

SUMMARY

According to one or more embodiments, an improved radiator assembly configured to improve heat transfer from a coolant in coolant channels of a cooling element to a cooling airflow through bordering fins in the cooling element with an upstream ventilator module.

The numerous fins extending between two coolant channels in the cooling element of the radiator are divided into at least two different cooling zones in a radiator assembly according to a first aspect of the proposed solution. A cooling airflow is conducted through gaps between adjacent fins in each of these cooling zones in order to discharge heat transferred to the numerous (cooling) fins from the coolant channels. A first cooling zone is at least partially covered by the ventilator module, and thus in the flow direction of a cooling airflow from the ventilator toward the cooling element. The width of the gap between two (adjacent) fins in this first cooling zone is greater than that in the second cooling zone in the cooling element. In other words, there is a greater spacing between adjacent fins in the first cooling zone that is at least partially covered by an upstream ventilator module, such that there is a larger gap than in at least one second cooling zone of the cooling element that is not covered by the ventilator module.

This relates to a flow resistance in front of at least part of the cooling element caused by the ventilator module in the proposed solution due to the design of a fin structure between two spaced apart coolant channels in the cooling element (with regard to the direction of a cooling airflow) in different areas in relation to the ventilator module. As a result, a greater amount of cooling air is able to pass between the fins in a first cooling zone than between the adjacent fins in a second cooling zone, where the cooling air is able to pass without the influence of the upstream ventilator module. This results in a more uniform cooling airflow over the entire cooling element with regard to the individual areas of the cooling element that are covered at least in part by a ventilator module such that less cooling air reaches them (for example, at least when the at least one fan in the ventilator module is stationary).

In the first cooling zone, covered at least in part by the ventilator module, the gaps between adjacent fins can be of different widths or identical widths. While the fins in the first cooling zone on the cooling element exhibit equidistant spacings in the latter case, there can also be an embodiment variant in which the gaps in the first cooling zone have different widths. These different or identical gap widths can be wider than the gaps between adjacent fins in a second cooling zone. This means, for example, that all of the gaps (which may also be different or identical) in the second cooling zone, which is not covered by the ventilator module, are narrower than the narrowest gap in the first cooling zone.

In a first embodiment variant, the widths of the gaps between adjacent fins in the first cooling zone are at least 1.2 times greater than the greatest width between adjacent fins in the second cooling zone.

By way of example, the different gap widths between adjacent fins in the at least two different cooling zones (i.e. the gap widths between adjacent fins in the at least one second cooling zone) are coordinated to one another and defined such that the most uniform possible cooling airflow is obtained over the entire cooling element. As an example, the widths of the gaps can be coordinated to one another and defined such that for at least one defined operating point, which is characterized by a specific airflow in the radiator assembly toward the cooling element, a flow speed of a portion of the cooling airflow, which flows as part of the cooling airflow to and through the numerous fins in the first cooling zone, is substantially or precisely identical to a flow speed of a portion of the cooling airflow that flows to and through the numerous fins in the second cooling zone. For at least one defined operating point, which is characterized by a specific cooling airflow in the radiator assembly toward the cooling element that flows through and past the ventilator module, an (average) flow speed of the cooling airflow in the first cooling zone is adjusted to an (average) flow speed of the cooling airflow in the second cooling zone via the various distances between the fines, and thus the widths of the gaps, in the case of an equal flow over a predefined flow surface upstream of the ventilator module. A substantially identical flow speed, for example a substantially identical average flow speed in the first and second cooling zones is understood to mean that there is a maximum difference of 10% in the flow speeds.

One possible operating point at which the adjustment can be made is characterized by a stationary fan in the ventilator module and a uniform airflow to the radiator assembly with cooling air at a predefined flow speed, i.e. with a (substantially) constant speed distribution. The layout of the fins, and therefore the distances therebetween, i.e. the widths of the gaps, are based on this. This makes it easier to ensure that there are no cooling airflows with unfavorably low flow speeds in the first cooling zone, which is covered by the ventilator module such that the airflow is blocked. In addition, a more uniform cooling airflow is obtained through the entire cooling element.

In another embodiment variant, the fins run in straight lines (e.g. not in zig-zags) between the coolant channels. By way of example, the coolant channels are parallel to one another, extending in a longitudinal direction. The fins may then be perpendicular to the longitudinal direction of the coolant channels.

Alternatively or additionally, at least one of the numerous fins, or all of the fins, can connect two coolant channels to one another. This directly improves the heat dissipation from the coolant channels. It is also conceivable that the fins merely extend from one coolant channel toward another, without connecting them to one another.

In one embodiment variant, the ventilator module is located upstream of the cooling element with respect to a cooling airflow, such that the first cooling zone, at least partially covered by the ventilator module, includes a central area of the cooling element, and the ventilator module has at least two edges, past which cooling air flows to at least two second cooling zones of the cooling element. The edges where cooling air can flow past then define an outer contour of the ventilator module, such that cooling air flowing past the edges is then conducted past the ventilator module toward a second cooling zone on the cooling element. Such a second cooling zone then includes an edge area of the cooling element outside the central area. The ventilator module in such an embodiment variant is therefore located centrally in front of the downstream cooling element, not covering it entirely, such that outside (e.g. to the right and left) of the central area, there are at least two uncovered cooling zones of the cooling element, in which the fins are spaced more closely to one another.

To increase the surface area between the coolant channels of the cooling element, at least one coolant channel has a blossom-shaped cross section in one embodiment variant. This means that the cross section of the respective coolant channel has a central (hollow) section (through which coolant flows) which has (at least two) radial sections extending outward therefrom. These radial sections can have circular cross sections or elongated, finger-shaped cross sections. The blossom-shaped cross section area can therefore form radial arms that protrude in the manner of petals, through which coolant, e.g. cooling liquid, flows when the radiator is in operation.

Alternatively or additionally, the cross section of at least one coolant channel in the radiator can taper toward one end in the manner of a teardrop. In this variant, at least one of the coolant channels therefore has a cross section with a rounded upstream, leading edge section, and a tapered downstream tailing edge section. By way of example, the leading-edge section can have a convex curvature, while the trailing edge section can taper to a point. This teardrop-shaped cross section for the at least one coolant channel results in a very low flow resistance, substantially preventing downstream turbulence in the coolant channel.

With regard to any complex cross sections in at least one of the coolant channels in the cooling element, and/or a special geometry of the fins, at least one coolant channel and/or the numerous fins are produced additively in one embodiment variant. At least one coolant channel and/or the numerous fins are therefore produced in an additive manufacturing process, e.g. through selective laser melting.

The blossom-shaped cross section described above for at least one coolant channel results in an enlarged surface area and therefore an improved heat transfer from the coolant channel to a cooling airflow. This advantageous effect is entirely independent of different gap sizes between adjacent fins in the different first and second cooling zones of the cooling element, and these variants can be readily combined with one another.

Accordingly, in a second independent aspect of the proposed solution, the radiator assembly for a vehicle that has at least one radiator comprising a cooling element has at least two coolant channels running at a spacing to one another with a blossom-shaped cross section.

The proposed solution also comprises a vehicle, for example a motor vehicle, that has a radiator assembly according to any of the embodiment variants described above or below.

BRIEF DESCRIPTION OF THE DRAWINGS

The attached drawings illustrate exemplary possible embodiment variants of the proposed solution.

Therein:

FIG. 1 shows, schematically, a radiator assembly according to the proposed solution, which has a cooling element with fins at different spacings to one another and which connect coolant channels to one another, and which has a ventilator module located in front of the cooling element;

FIG. 3 shows an embodiment variant of a ventilator module for the radiator assembly shown in FIG. 1.

DETAILED DESCRIPTION

Figure 2A:
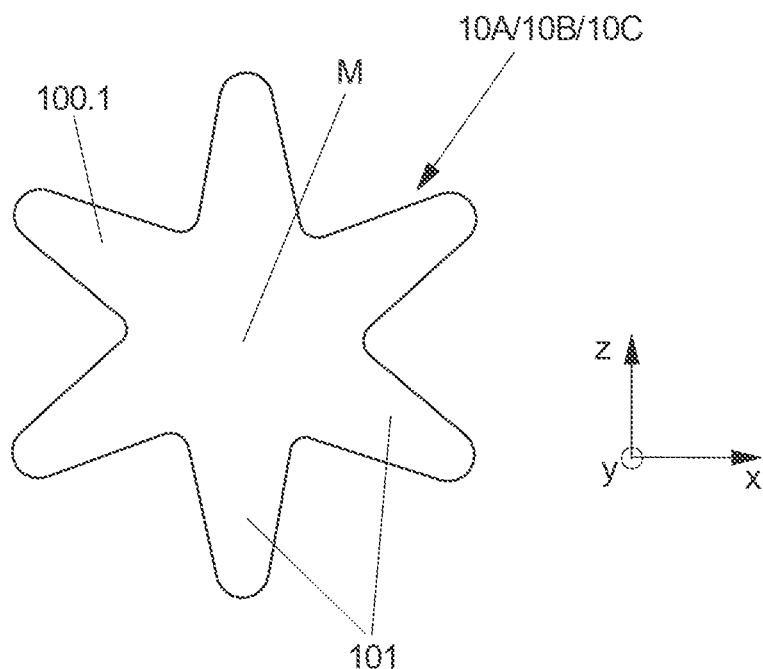
FIG. 2A shows a cross sectional view of an embodiment variant of a coolant channel in the radiator assembly shown in FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 3 shows a ventilator module 2 from the front for a radiator assembly in a motor vehicle. The ventilator module 2 has a rectangular frame 20 in the present example, which also supports a fan 21. The fan 21 can be operated by an electric motor 23 via a rotating axle in the center of the fan 21. The motor 23 is attached to a motor mount 22 in the frame 20. The motor mount 22 is connected to a surrounding supporting section of the frame 20 via numerous radial struts 220, wherein a hole for the bearing for the fan 21 is formed in this supporting section. The outer contour of the frame 20 and thus the ventilator module 2 is defined in part by two edges 24A and 24B. These edges 24A and 24B are at the left and right of the illustration in FIG. 3.

The ventilator module 2 in FIG. 3 can be placed in front of a radiator in a motor vehicle. The ventilator module can be operated in two different functional modes. In the first mode, cooler flaps on the frame 20 can be opened or closed while the motor vehicle is underway, in order to regulate the airflow toward the radiator. When the vehicle is travelling slowly or stationary, a (supplementary) cooling airflow is generated toward the radiator by the rotating fan 21.

As can be seen in the schematic illustration in FIG. 1 of a radiator assembly that has a radiator 1 and the ventilator module 2, the ventilator module 2 covers at least part of the radiator 1 from the front when it is assembled as intended, such that the ventilator 2 is in front of the radiator 1. As a result, airflow to the radiator 1 is therefore blocked, at least in part, by the ventilator module 2. The ventilator module 2 therefore forms a flow resistance for the cooling airflow to the radiator 1, for example when the fan 21 is stationary.

The radiator 1 has a cooling element 1.1 that comprises numerous parallel coolant channels 10A, 10B, 10C. The coolant channels 10A, 10B, 10C are spaced apart along the spatial direction z and are parallel along the longitudinal direction y. There are numerous fins 11 that extend in a straight line transverse to the longitudinal direction y, which connect the coolant channels 10A, 10B, 10C to one another. A cooling liquid is conducted through the coolant channels 10A, 10B, 10C to dissipate heat from the engine compartment in the motor vehicle. Heat is transferred from the cooling liquid and therefore the coolant channels 10A, 10B, 10C to cooling air via the airflow surrounding the coolant channels 10A, 10B, 10C and their connections via the fins 11, which are also subjected to a cooling airflow.

While the central cooling zone Z1 of the cooling element 1.1 can only be subjected to cooling air by the ventilator module 2 in the present example, cooling air reaches the cooling zones Z2A and Z2B at the edges, which flows past the sides of the ventilator module 2, such as at its edges 24A and 24B to the cooling element 1.1. To obtain a uniform cooling airflow over the entire cooling element 1.1 in this embodiment variant, and to provide more air, such as in the part of the cooling element 1.1 that is at least partially covered from the front by the ventilator module 2, there are different cooling zones Z1, Z2A, and Z2B on the cooling element 1.1, where the fins 11 have different spacings to one another. The fins 11 in the first cooling zone Z1, which is at least partially covered by the ventilator module 2, therefore have a greater spacing to one another. There is therefore a larger gap 111, with a width d1, between adjacent fins 11, which is greater than a width d2 in a gap 112 between two adjacent fins 11 in a cooling zone Z2A or Z2B that is not covered by the ventilator module 2, potentially by a multiple thereof, and such as by a factor of at least 1.2.

As a result of the smaller fin spacing, resulting in smaller gap widths d2 in the cooling zones Z2A and Z2B at the edges, and the larger gap widths d1 in the central, first cooling zone Z1, at least partially covered by the ventilator module 2, the cooling air can flow between the fins 11 with comparable flow speeds. This also results in a (more) uniform cooling airflow over the entire cooling element 1.1.

The different gap widths d1 and d2 between adjacent fins 11 in the different cooling zones Z1, Z2A and Z2B are coordinated to one another, potentially by using a flow simulation, and defined such that for at least one defined operating point for the radiator assembly, which is characterized by a specific airflow to the radiator assembly with cooling air toward the cooling element 1.1 passing through and past the ventilator module 2, an average flow speed for a portion of the cooling air from the airflow, which flows as part of the cooling airflow at and through the numerous fins 11 in the first cooling zone Z1, corresponds substantially (with a difference of no more than 10%) to an average flow speed for a portion of the cooling air from the airflow that flows as a further portion of the cooling airflow at and through the numerous fins 11 in the second cooling zones Z2A and Z2B. By way of example, this operating point can be characterized by a stationary fan 21 and a uniform airflow of cooling air at a specific flow speed and therefore a constant speed distribution over the entire cross section of the radiator assembly. The spacings d1, d2 between the fins 11 are determined for this operating point, or potentially for numerous operating points, which result in a most optimal uniform distribution of the flow speeds over the entire cooling element 1.1.

Figure 2B:
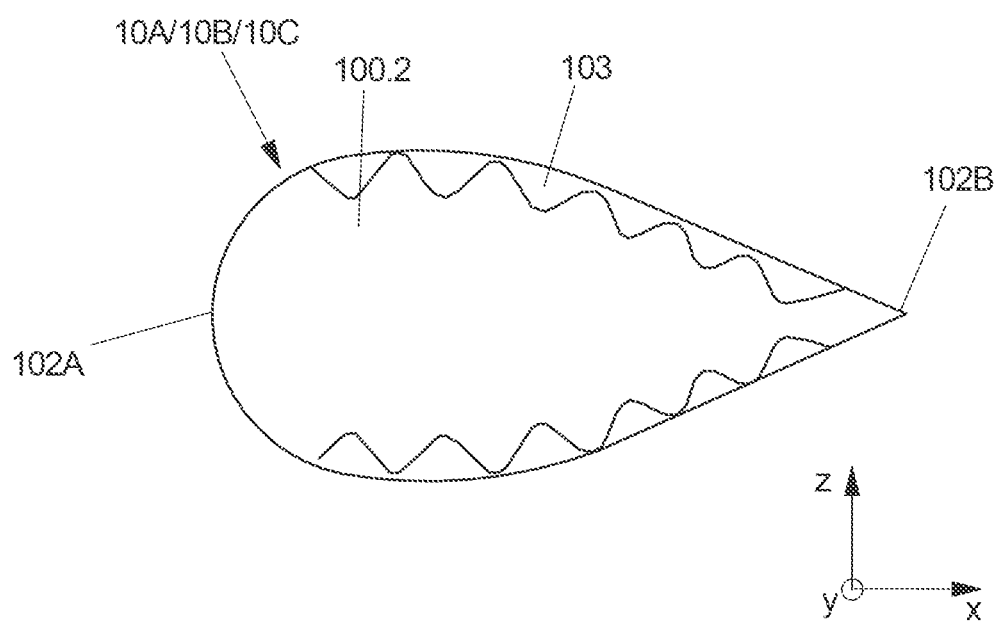
FIG. 2B shows a cross sectional view of another embodiment variant of a coolant channel in the radiator assembly shown in FIG. 1.

To further improve the heat transfer and for example to increase the surface area of the tube-shaped coolant channels 10A, 10B, 10C, at least one coolant channel, or all of the coolant channels 10A, 10B, 10C can have a blossom-shaped cross section, in accordance with the illustration in FIG. 2B. One coolant channel 10A, 10B, or 10C then has a blossom-shaped cross section 100.1. In the exemplary embodiment shown in FIG. 2A, numerous radial arms 101 extend radially, in the shape of fingers, from a central section of the cross section area 100.1, which has a center or focal point M.

In one embodiment variant, at least one of the coolant channels 10A, 10B, or 10C, or all of the coolant channels 10A, 10B, and 10C in the cooling element 1.1 can have a flow-optimized cross section corresponding to that shown in FIG. 2B. The coolant channel 10A, 10B, or 10C then has a teardrop-shaped cross section 100.2. This teardrop-shaped cross section 100.2 then has an upstream, convex leading edge section 102A and a downstream, tapered, potentially pointed, trailing edge section 102B.

There can also be numerous inward-facing bulges or swells 102 on the inner walls of a coolant channel 10A, 10B, 10C in order to increase the surface area thereof, as shown in FIG. 2B. This likewise increases the surface area for the thermal exchange.

As an example, the potentially complex designs for the cross sections 100.1 and 100.2 in FIGS. 2A and 2B can be produced by means of an additive manufacturing process. Analogously, the fins 11 can also be manufactured with different cross sections, and for example through additive manufacturing processes.

In one possible development, the numerous (cooling) fins 11 can be arranged in an energy-absorbing grid structure. As a result, the straight and parallel fins 11 in the present example can potentially be combined with optimized tube cross sections for cooling channels 10A, 10B, 10C that results not only in a greater efficiency for the radiator assembly in comparison with typical radiator assemblies, but also reduces the size and weight of the radiator 1. This also results in an improved absorption of forces applied to the radiator assembly in the event of a crash, deriving from the formation of an energy-absorbing grid structure for the fins.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

| List of Reference Symbols | |
|---|---|
| 1 | radiator |
| 1.1 | cooling element |
| 100.1, 100.2 | cross section |
| 101 | radial arm |
| 102A | leading edge section |
| 102B | trailing edge section |
| 103 | bulge |
| 10A, 10B, 10C | coolant channel |
| 11 | fin |
| 111, 112 | gap |
| 2 | ventilator module |
| 20 | frame |
| 21 | fan |
| 22 | motor mount |
| 220 | strut |
| 23 | motor |
| 24A, 24B | edge |
| M | center/focal point |
| Z1, Z2A, Z2B | cooling zone |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A radiator assembly for use in a vehicle, the radiator assembly comprising:
a radiator including a cooling element provided with at least two coolant channels spaced apart from one another, and a number of fins extending between the at least two coolant channels, wherein the number of fins are arranged to form a number of gaps between each of the number of fins, and the number of gaps are configured to receive a cooling airflow; and
a ventilator module including a fan configured to conduct the cooling airflow toward the cooling element,
wherein the number of fins are divided into at least two different cooling zones including a first cooling zone and a second cooling zone,
wherein the ventilator module at least partially covers the first cooling zone of the at least two different cooling zones with respect to a direction extending from the ventilator module toward the cooling element, and two fins disposed in the first cooling zone form a first gap of the number of gaps, wherein the first gap defining a first gap width and two fins disposed in the second cooling zone form a second gap defining a second gap width, wherein the first gap width is greater than the second gap width.

2. The radiator assembly of claim 1, wherein the number of gaps include a first number of gaps formed between adjacent fins of the number of fins disposed in the first cooling zone, the first number of gaps define first gap widths that are different from one another or identical to one another.

3. The radiator assembly of claim 2, wherein the number of gaps include a second number of gaps formed between adjacent fins of the number of fins disposed in the second cooling zone, the second number of gaps define second gap widths that are different from one another or identical to one another.

4. The radiator assembly of claim 3, wherein the first number of gap widths are greater than the second number of gap widths by a factor of at least 1.2.

5. The radiator assembly of claim 3, wherein each of the first number of gap widths are greater than each of the second number of gap widths.

6. The radiator assembly of claim 1, wherein various gap widths formed between adjacent fins of the number of fins disposed in the at least two different cooling zones are defined with respect to one another such that for at least one defined operating point, in which a specific airflow of the cooling airflow is conducted toward the cooling element,
a first flow speed of a first portion of the cooling airflow flowing towards and through the number of fins disposed in the first cooling zone is substantially or precisely identical to a second flow speed of a second portion of the cooling airflow flowing to and through the number of fins disposed in the second cooling zone.

7. The radiator assembly of claim 1, wherein the number of fins each extend in a straight line.

8. The radiator assembly of claim 1, wherein each fin of the number of fins connect the at least two coolant channels to one another.

9. The radiator assembly of claim 1, wherein the ventilator module is located upstream from the cooling element with respect to a direction of the cooling airflow, such that the first cooling zone includes a central part of the cooling element, and the ventilator module is provided with at least two edges, and a portion of the cooling airflow flows past the at least two edges toward the second cooling zone.

10. The radiator assembly of claim 1, wherein at least one coolant channel of the at least two coolant channels has a blossom-shaped cross-section.

11. The radiator assembly of claim 1, wherein at least one coolant channel of the at least two coolant channels and/or the number of fins are produced additively.

12. The radiator assembly of claim 1, wherein at least one coolant channel of the at least two coolant channels has a teardrop-shaped cross-section, wherein the teardrop-shaped cross-section tapers toward a trailing edge section.

13. A radiator assembly for use in a vehicle, the radiator assembly comprising:
a radiator including at least one cooling element provided with at least two coolant channels, wherein each of the at least two coolant channels are spaced apart from one another,
wherein at least one coolant channel of the at least two coolant channels has a blossom-shaped cross-section.

14. A radiator assembly for use in a vehicle, the radiator assembly comprising:
a radiator provided with,
a number of cooling channels each extending in a horizontal direction and spaced apart from one another in a vertical direction,
a first number of fins extending between each of the cooling channels of the number of cooling channels, wherein adjacent fins of the first number of fins are spaced apart from one another by a first distance to form a first gap,
a second number of fins extending between each of the cooling channels of the number of cooling channels, wherein adjacent fins of the second number of fins are spaced apart from one another by a second distance to form a second gap, wherein the first distance is greater than the second distance, and the number of cooling channels, the number of fins, and the second number of fins define a number of cooling zones; and a ventilator module provided with a fan configured to direct a cooling air flow towards the radiator and through the first and second gaps, wherein the ventilator at least partially overlaps a first cooling zone of the number of cooling zones and the first number of fins are disposed in the first cooling zone and the second number of fins are disposed in a second cooling zone of the number of cooling zones.

15. The radiator assembly of claim 14, wherein the number of cooling zones includes a third cooling zone, wherein some of the second number of fins are disposed in the third cooling zone, and the first cooling zone is disposed between the second and third cooling zones with respect to the horizontal direction.

16. The radiator assembly of claim 14, wherein the number of cooling channels include a first cooling channel, a second cooling channel, and a third cooling channel disposed between the first and second cooling channels.

17. The radiator assembly of claim 16, wherein the first, second, and third cooling channels are aligned with one another to form a column in a vertical direction.

18. The radiator assembly of claim 16, wherein the first and second number of fins extending between the first and third cooling channels include a first pair of peripheral fins and the first and second number of fins extending between the second cooling channel and the third cooling channel include a second pair of peripheral fins, and the first pair of peripheral fins are offset from the second pair of peripheral fins with respect to the horizontal direction.

19. The radiator assembly of claim 14, wherein the first distance is at least 20% greater than the second distance.

20. The radiator assembly of claim 14, wherein the first cooling zone is wider than the second cooling zone.

\* \* \* \* \*